US012615571B2

(12) United States Patent
Wu et al.

(10) Patent No.: US 12,615,571 B2
(45) Date of Patent: Apr. 28, 2026

(54) METHOD AND APPARATUS FOR ROUTING DATA IN A COMMUNICATION SYSTEM

(71) Applicant: Lenovo (Beijing) Ltd., Beijing (CN)

(72) Inventors: Lianhai Wu, Chaoyang (CN); Joachim Löhr, Wiesbaden (DE); Ran Yue, Haidian District (CN); Jing Han, Chaoyang District (CN); Haiming Wang, Xicheng District (CN)

(73) Assignee: Lenovo (Beijing) Ltd., Beijing (CN)

( * ) Notice: Subject to any disclaimer, the term of this patent is extended or adjusted under 35 U.S.C. 154(b) by 913 days.

(21) Appl. No.: 17/789,922

(22) PCT Filed: Dec. 31, 2019

(86) PCT No.: PCT/CN2019/130557
§ 371 (c)(1),
(2) Date: Jun. 29, 2022

(87) PCT Pub. No.: WO2021/134499
PCT Pub. Date: Jul. 8, 2021

(65) Prior Publication Data
US 2023/0036769 A1      Feb. 2, 2023

(51) Int. Cl.
*H04W 36/30* (2009.01)
*H04B 1/74* (2006.01)
*H04W 40/34* (2009.01)

(52) U.S. Cl.
CPC .......... *H04W 36/305* (2018.08); *H04B 1/745* (2013.01); *H04W 40/34* (2013.01)

(58) Field of Classification Search
CPC ... H04W 36/305; H04W 40/34; H04W 40/22; H04B 1/745; H04L 45/74; H04L 45/28
See application file for complete search history.

(56) References Cited

U.S. PATENT DOCUMENTS

2013/0177305 A1      7/2013  Prakash et al.
2021/0195674 A1*     6/2021  Park ...................... H04W 76/18
(Continued)

FOREIGN PATENT DOCUMENTS

WO        2019216670 A1    11/2019

OTHER PUBLICATIONS 201980103250.9 , "Foreign Office Action", CN Application No. 201980103250.9, Jul. 8, 2024, 9 pages.
(Continued)

*Primary Examiner* — Ashley Shivers
(74) *Attorney, Agent, or Firm* — FIG. 1 Patents

(57) ABSTRACT

The present disclosure relates to methods and apparatuses. According to some embodiments of the disclosure, a method includes: receiving configuration information at a communication device, wherein the configuration information indicates routing configuration and bearer mapping configuration; detecting a failure on a first egress link between the communication device and a first next hop communication device of the communication device; re-routing first data intended to be transmitted on the first egress link, wherein the first data has not been acknowledged by a layer lower than a BAP layer of the communication device; reselecting a second egress link between the communication device and a second next hop communication device based on the routing configuration; reselecting an egress RLC channel of the second egress link based on bearer mapping configuration; and submitting the first data to the reselected egress RLC channel of the second egress link.

20 Claims, 8 Drawing Sheets

(56) References Cited

U.S. PATENT DOCUMENTS

| | | | | |
|---|---|---|---|---|
| 2021/0195675 | A1* | 6/2021 | Park | H04W 88/14 |
| 2022/0015000 | A1* | 1/2022 | Fujishiro | H04W 40/24 |
| 2022/0217613 | A1* | 7/2022 | Teyeb | H04L 47/125 |
| 2022/0225129 | A1* | 7/2022 | Chen | H04L 45/28 |
| 2022/0279552 | A1* | 9/2022 | Teyeb | H04W 40/22 |

OTHER PUBLICATIONS

"Foreign Office Action", CN Application No. 201980103250.9, Nov. 29, 2024, 15 pages.

ASUSTEK , "On the consideration of routing for reporting pre-emptive BSR", 3GPP TSG-RAN WG2 Meeting #107bis, R2-1913764, Chongqing, China [retrieved Aug. 22, 2022]. Retrieved from the Internet <https://www.3gpp.org/ftp/tsg_ran/WG2_RL2/TSGR2_107bis/Docs?sortby=sizerev>., Oct. 2019, 10 Pages.

HUAWEI , "Routing in IAB network", 3GPP TSG-RAN WG3 meeting #106, R3-196992, Reno, Nv, USA [retrieved Aug. 22, 2022]. Retrieved from the internet <https://www.3gpp.org/ftp/TSG_RAN/WG3_lu/TSGR3_106/Docs/?sortby=sizerev>., Nov. 2019, 8 Pages.

PCT/CN2019/130557 , "International Preliminary Report on Patentability", PCT Application No. PCT/CN2019/130557, Jul. 14, 2022, 8 pages.

PCT/CN2019/130557 , "International Search Report and Written Opinion", PCT Application No. PCT/CN2019/130557, Oct. 12, 2020, 10 pages.

ZTE , "Discussion on BAP configuration", 3GPP TSG-RAN WG3#105bis, R3-195688, Chongqing, China [retrieved Aug. 22, 2022]. Retrieved from the internet <https://www.3gpp.org/ftp/tsg_ran/WG3_lu/TSGR3_105bis/Docs>., Oct. 2019, 4 Pages.

ZTE , "Discussion on Re-routing in IAB network", 3GPP TSG-RAN WG3 Meeting#105bis, R3-195693, Chongqing, China [retrieved Aug. 22, 2022]. Retrieved from the internet <https://www.3gpp.org/ftp/tsg_ran/WG3_lu/TSGR3_105bis/Docs>., Oct. 2019, 3 Pages.

19958674.4 , "Extended European Search Report", EP Application No. 19958674.4, Aug. 21, 2023, 12 pages.

Huawei , et al., "Lossless data delivery", 3GPP TSG-RAN WG2 meeting #106, R2-1906971, Revision of R2-1903982, Reno, USA [retrieved Oct. 16, 2023]. Retrieved from the Internet <https://www.3gpp.org/ftp/tsg_ran/WG2_RL2/TSGR2_106/Docs>, May 2019, 5 pages.

LG Electronics , "Resolving open issues on BH RLF", 3GPP TSG-RAN WG2 Meeting #107bis, R2-1913803, Chongqing, China [retrieved Oct. 16, 2023]. Retrieved from the Internet <https://www.3gpp.org/ftp/tsg_ran/WG2_RL2/TSGR2_107bis/Docs>, Aug. 2019, 6 pages.

SAMSUNG , "Upstream BH link RLF notification", 3GPP TSG-RAN WG2 Meeting #107bis, R2-1913813, was R2-1910376, Chongqing, China [retrieved Oct. 16, 2023]. Retrieved from the Internet <https://www.3gpp.org/ftp/tsg_ran/WG2_RL2/TSGR2_107bis/Docs>, Oct. 2019, 6 pages.

201980103250 , "Foreign Office Action", CN Application No. 201980103250, Dec. 26, 2023, 10 pages.

Foreign Office Action issued in EP Application No. 19958674.4, mailed Nov. 18, 2025, 7 pages.

* cited by examiner

100A 150A     150B     140     170

151A     151B     152B

152A 142     141

160A     160B     160C

300 receiving ⎯311 selecting ⎯313 constructing ⎯315

500

600

700

METHOD AND APPARATUS FOR ROUTING DATA IN A COMMUNICATION SYSTEM

TECHNICAL FIELD

The present disclosure generally relates to wireless communication technology, and more particularly to the routing of data in a wireless communication system.

BACKGROUND

In the 3rd Generation Partnership Project (3GPP), deployment of Relay Nodes (RNs) in a wireless communication system is promoted. One objective of deploying RNs is to enhance coverage area of a Base Station (BS, also called gNB in 5G networks) by improving the throughput of a mobile device (also known as a User Equipment (UE)) that is located in a coverage hole or far from the BS, which can result in relatively low signal quality.

In a wireless communication system which employs RNs, a BS that can provide connection to at least one RN is called a donor BS (or a donor node or a donor). An RN is connected to a donor BS by a backhaul link. The RN may hop through one or more RNs before reaching the donor BS, or may be directly connected to the donor BS. For the New Radio (NR) communication networks, 3GPP is envisioning an Integrated Access and Backhaul (IAB) architecture for supporting multi-hop relays, wherein a donor node with multi-connectivity is also supported by an IAB node. That is, the IAB node may have a plurality of active routes to the donor BS via multiple parent IAB nodes. A multi-hop network may provide more range extension than a single-hop network. This is relatively more beneficial with respect to wireless communications at frequencies above 6 GHz, which have limited ranges when using single-hop backhauling. Multi-hop backhauling further enables backhauling around obstacles, e.g., buildings in an urban environment for in-cluster deployments.

In a wireless communication system, uplink transmission may be routed to a base station through one or more IAB nodes. Similarly, downlink transmission to a UE or an IAB node may be routed through one or more IAB nodes. However, a wireless backhaul link between two IAB nodes may fail under certain circumstances. Therefore, a method for routing or re-routing uplink transmission or downlink transmission is required for a wireless communication system when a failure occurs on the backhaul link.

SUMMARY OF THE DISCLOSURE

An embodiment of the present disclosure provides a method. The method may include: receiving configuration information at a communication device, wherein the configuration information may indicate routing configuration and bearer mapping configuration; detecting a failure on a first egress link between the communication device and a first next hop communication device of the communication device; re-routing first data intended to be transmitted on the first egress link, wherein the first data may have not been acknowledged by a layer lower than a Backhaul Adaptation Protocol (BAP) layer of the communication device; reselecting a second egress link between the communication device and a second next hop communication device based on the routing configuration; reselecting an egress Radio Link Control (RLC) channel of the second egress link based on bearer mapping configuration; and submitting the first data to the reselected egress RLC channel of the second egress link.

In an embodiment of the present application, the first next hop communication device may be a parent node of the communication device. The method may further include in response to the failure on the first egress link and re-routing the first data to the second next hop communication device, transmitting a Buffer Status Report (BSR) or a Pre-emptive BSR (Pre-BSR) associated with the first data to the second next hop communication device. In an embodiment of the present application, the reselected egress RLC channel may correspond to a logical channel in a Logical Channel Group (LCG), and the logical channel is considered as having the highest priority level within the LCG. In an embodiment of the present application, the method may further include transmitting a Scheduling Request (SR) to the second next hop communication device if there is no uplink resource available for transmitting the BSR or the Pre-BSR.

In an embodiment of the present application, the configuration information may further indicate at least one candidate routing identity, and wherein each candidate routing identity may indicate a BAP address, a BAP path identity, and a next hop BAP address. In an embodiment of the present application, the method may further include receiving second data from an upper layer; and encoding the second data into a BAP Protocol Data Unit (PDU) may include a BAP address field and a path field by: reselecting a candidate routing identity from the at least one candidate routing identity, wherein an egress link associated with the selected candidate routing identity may not include the failed first egress link between the communication device and the first next hop communication device; and constructing the BAP PDU by setting the BAP address field to the BAP address of the selected candidate routing identity and setting the path field to the BAP path identity of the selected candidate routing identity.

In an embodiment of the present application, the routing configuration may include at least one entry, each entry may include a BAP address and a next hop BAP address. Each entry of the routing configuration may further include a path identity. In an embodiment of the present application, the method may further include receiving the first data from an ingress RLC channel of an ingress link of the communication device; decoding the first data into a BAP Protocol Data Unit (PDU), a header of the BAP PDU may include a BAP address field; and determining that there is no entry in the routing configuration having a same BAP address as the BAP address in the header of the BAP PDU. The step of reselecting the second egress link may include selecting one available egress link of the communication device as the second egress link.

In an embodiment of the present application, the method may further include allowing re-routing at the communication device in response to receiving the bearer mapping configuration.

In an embodiment of the present application, for BAP Protocol Data Unit (PDU) received from an ingress RLC channel of an ingress link, and for uplink BAP Service Data Unit (SDU) received from an upper layer, the bearer mapping configuration may indicate a common default egress RLC channel of the second egress link for re-routing.

In an embodiment of the present application, for BAP Protocol Data Unit (PDU) received from an ingress RLC channel of an ingress link, and for uplink BAP Service Data Unit (SDU) received from an upper layer, the bearer mapping configuration may indicate respective default egress RLC channels of the second egress link for re-routing.

In an embodiment of the present application, for BAP Protocol Data Unit (PDU) received from an ingress RLC channel of an ingress link, the bearer mapping configuration may indicate bearer mapping between a User Equipment (UE) bearer in the ingress RLC channel of the ingress link and an egress RLC channel of the second egress link for re-routing; and for uplink BAP Service Data Unit (SDU) received from an upper layer, the bearer mapping configuration may indicate bearer mapping between a UE bearer and an egress RLC channel of the second egress link for re-routing.

In an embodiment of the present application, the configuration information may be received via F1 signaling or Radio Resource Control (RRC) signaling.

Another embodiment of the present disclosure provides a method. The method may include: receiving configuration information at a communication device, wherein the configuration information may indicate routing configuration may include at least one entry, and each entry may include a Backhaul Adaptation Protocol (BAP) address; and detecting a failure on a first egress link between the communication device and a first next hop communication device of the communication device.

In an embodiment of the present application, the method may further include prohibiting re-routing at the communication device if the configuration information does not include bearer mapping configuration.

In an embodiment of the present application, the method may further include receiving first data from an ingress Radio Link Control (RLC) channel of an ingress link of the communication device, wherein the first data may be intended to be transmitted on the first egress link; decoding the first data into a BAP Protocol Data Unit (PDU), a header of the BAP PDU may include a BAP address field; determining that there is no entry in the routing configuration having a same BAP address as the BAP address in the header of the BAP PDU; and transmitting assistant information to a base station, wherein the assistant information may indicate no available link for transmitting the first data.

Another embodiment of the present disclosure provides a method. The method may include: receiving configuration information indicating at least one candidate path identity; detecting a failure in a backhaul link between two communication devices; selecting a candidate path identity from the at least one candidate path identity for downlink transmission, wherein an egress link associated with the selected candidate path identity may not include the failed backhaul link between the two communication devices; and transmitting the downlink transmission on the egress link.

In an embodiment of the present application, the configuration information may indicate bearer mapping configuration. In an embodiment of the present application, the bearer mapping configuration may indicate a default egress Radio Link Control (RLC) channel of the egress link for re-routing. The method may further include selecting the default egress RLC channel of the egress link for transmitting the downlink transmission. In an embodiment of the present application, the bearer mapping configuration may indicate bearer mapping between a User Equipment (UE) bearer and an egress Radio Link Control (RLC) channel of the egress link for re-routing.

In an embodiment of the present application, the configuration information may be received via F1 signaling.

Another embodiment of the present disclosure provides a method. The method may include transmitting configuration information to a communication device or a Distributed Unit (DU) of a base station. The configuration information may indicate bearer mapping configuration.

In an embodiment of the present application, for Backhaul Adaptation Protocol (BAP) Protocol Data Unit (PDU) received from an ingress Radio Link Control (RLC) channel of an ingress link, for uplink BAP Service Data Unit (SDU) received from an upper layer, and for downlink BAP SDU received from an upper layer, the bearer mapping configuration may indicate a common default egress RLC channel of an egress link for re-routing.

In an embodiment of the present application, for Backhaul Adaptation Protocol (BAP) Protocol Data Unit (PDU) received from an ingress Radio Link Control (RLC) channel of an ingress link, for uplink BAP Service Data Unit (SDU) received from an upper layer, and for downlink BAP SDU received from an upper layer, the bearer mapping configuration may indicate respective default egress RLC channels of an egress link for re-routing.

In an embodiment of the present application, for Backhaul Adaptation Protocol (BAP) Protocol Data Unit (PDU) received from an ingress Radio Link Control (RLC) channel of an ingress link, the bearer mapping configuration may indicate bearer mapping between a User Equipment (UE) bearer in the ingress RLC channel of the ingress link and an egress RLC channel of an egress link for re-routing; for uplink BAP Service Data Unit (SDU) received from an upper layer, the bearer mapping configuration may indicate, the bearer mapping configuration may indicate bearer mapping between a UE bearer and an egress RLC channel of an egress link for re-routing; and for downlink BAP SDU received from an upper layer, the bearer mapping configuration may indicate bearer mapping between a UE bearer and an egress RLC channel of an egress link for re-routing.

Yet another embodiment of the present disclosure provides an apparatus. According to some embodiments of the present disclosure, the apparatus includes: at least one non-transitory computer-readable medium having computer executable instructions stored therein; at least one receiving circuitry; at least one transmitting circuitry; and at least one processor coupled to the at least one non-transitory computer-readable medium, the at least one receiving circuitry and the at least one transmitting circuitry, wherein the at least one non-transitory computer-readable medium and the computer executable instructions are configured to, with the at least one processor, to cause the apparatus to perform a method according to some embodiments of the present disclosure.

BRIEF DESCRIPTION OF THE DRAWINGS

In order to describe the manner in which the advantages and features of the disclosure can be obtained, a description of the disclosure is rendered by reference to specific embodiments thereof, which are illustrated in the appended drawings. These drawings depict only exemplary embodiments of the disclosure and are not therefore to be considered limiting of its scope.

DETAILED DESCRIPTION

The detailed description of the appended drawings is intended as a description of preferred embodiments of the present disclosure and is not intended to represent the only form in which the present disclosure may be practiced. It should be understood that the same or equivalent functions may be accomplished by different embodiments that are intended to be encompassed within the spirit and scope of the present disclosure.

Figure 1A:
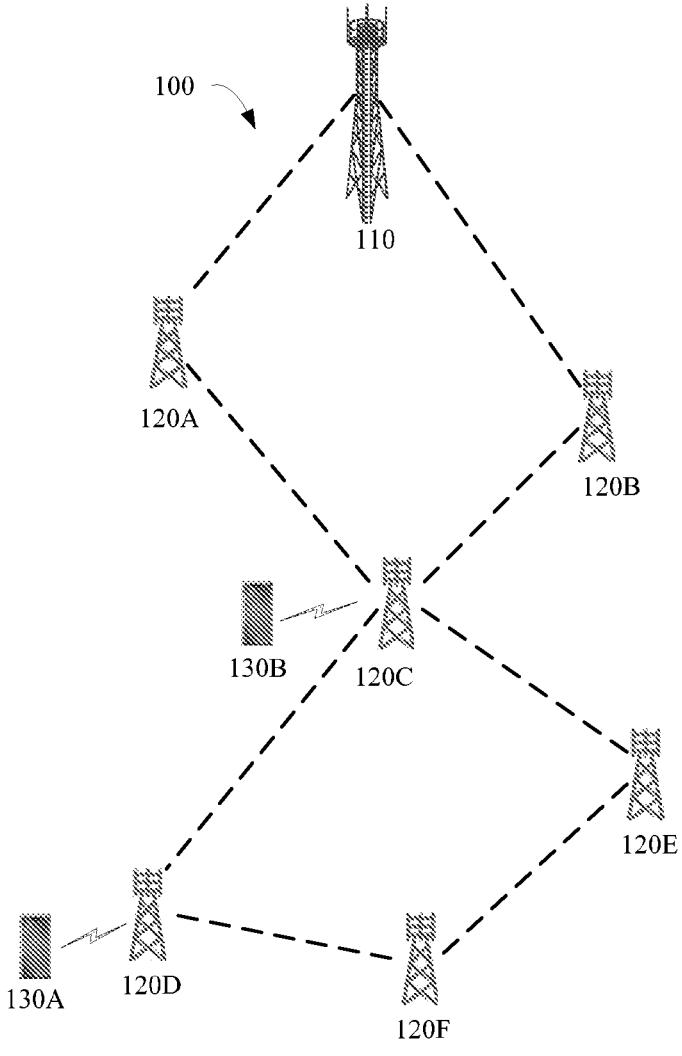
FIG. 1A illustrates a schematic wireless communication system according to some embodiments of the present disclosure.

FIG. 1A illustrates a wireless communication system 100 according to some embodiments of the present disclosure.

Referring to FIG. 1A, the wireless communication system 100 can include an IAB donor node (e.g., donor node 110), some IAB nodes (e.g., IAB node 120A, IAB node 120B, IAB node 120C, IAB node 120D, IAB node 120E, and IAB node 120F), and some UEs (e.g., UE 130A and UE 130B). Although merely, for simplicity, one donor node is illustrated in FIG. 1A, it is contemplated that the wireless communication system 100 may include more donor node(s) in some other embodiments of the present disclosure. Similarly, although merely six IAB nodes are illustrated in FIG. 1A for simplicity, it is contemplated that the wireless communication system 100 may include more or fewer IAB nodes in some other embodiments of the present disclosure. Although merely two UEs are illustrated in FIG. 1A for simplicity, it is contemplated that the wireless communication system 100 may include more or fewer UEs in some other embodiments of the present disclosure.

IAB node 120A is directly connected to donor node 110. IAB node 120B is directly connected to donor node 110. IAB node 120A can be connected to donor node(s) other than donor node 110 in accordance with some other embodiments of the present disclosure. IAB node 120B can be connected to donor node(s) other than donor node 110 in accordance with some other embodiments of the present disclosure.

IAB node 120C can reach donor node 110 via IAB node 120A or IAB node 120B. IAB node 120A and IAB node 120B are parent nodes of IAB node 120C. In other words, IAB node 120C is a child node of IAB node 120A and IAB node 120B. IAB node 120D may be directly connected to IAB node 120C. In some cases, IAB node 120D may reach IAB node 120C via IAB node 120E and IAB node 120F. In these cases, IAB node 120D, IAB node 120E and IAB node 120F are downstream IAB nodes of IAB node 120C, and IAB node 120E is a child node of IAB node 120C. Similarly, IAB node 120E may be directly connected to IAB node 120C. In some cases, IAB node 120E may reach IAB node 120C via IAB node 120D and IAB node 120F. IAB node 120F can reach IAB node 120C via IAB node 120D or IAB node 120E. In some examples, IAB node 120F may reach donor node 110 via IAB node 120E, IAB node 120C, and IAB node 120A. In these examples, IAB node 120E, IAB node 120C, and IAB node 120A are upstream IAB nodes of IAB node 120F, and IAB node 120E is a parent node of IAB node 120F.

UE 130A is directly connected to IAB node 120D, and UE 130B is directly connected to IAB node 120C. In other words, UE 130A and UE 130B are served by IAB node 120D and IAB node 120C, respectively. In some other embodiments of the present disclosure, UE 130A and UE 130B may also be referred to as child nodes of IAB node 120D and IAB node 120C, respectively.

Each of IAB node 120A, IAB node 120B, IAB node 120C, IAB node 120D, IAB node 120E, and IAB node 120F may be directly connected to one or more UEs in accordance with some other embodiments of the present disclosure.

Each of IAB node 120A, IAB node 120B, IAB node 120C, IAB node 120D, IAB node 120E, and IAB node 120F may be directly connected to one or more IAB nodes in accordance with some other embodiments of the present disclosure.

In the wireless communication system 100, which provides multi-hop relay, a wireless backhaul link may fail due to, for example but is not limited to, blockage by moving object(s) (e.g., vehicle(s)), foliage (caused by seasonal changes), new building(s) (e.g., infrastructure changes). Such backhaul link failure may occur either on a physically stationary IAB node or a mobile IAB node. Various techniques have been developed to address this issue. In some embodiments of the present disclosure, assuming that a Radio Link Failure (RLF) occurs on the backhaul link between IAB node 120A and IAB node 120C, IAB node 120C may route or re-route data intended to be transmitted to donor node 110 via IAB node 120A to IAB node 120B. The above mentioned routing or re-routing technique will be described in detail in the following text.

Figure 1B:
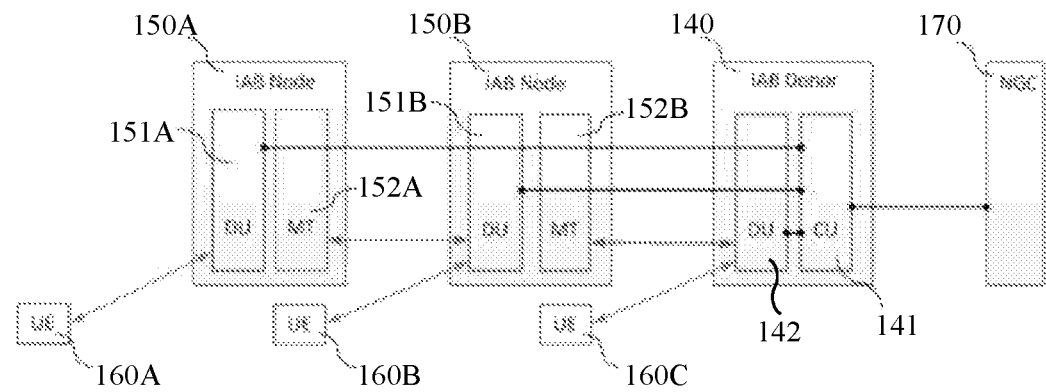
FIG. 1B illustrates a schematic wireless communication system according to some embodiments of the present disclosure.

FIG. 1B illustrates an exemplary wireless communication system 100A according to some embodiments of the present disclosure.

Referring to FIG. 1B, the wireless communication system 100A may include IAB donor 140, IAB node 150A, IAB node 150B, UE 160A, UE 160B, UE 160C and a Next-Generation Core (NGC) 170.

Each of the IAB node 150A and IAB node 150B may include a Distributed Unit (DU) and a Mobile Termination (MT). In the context of this disclosure, MT is referred to as a function resided in an IAB node that terminates the radio interface layers of the backhaul Uu interface toward an IAB donor or other IAB nodes. The IAB nodes may be connected to an upstream IAB node or a BS (e.g., an IAB donor) via the MT function. The IAB nodes may be connected to UEs and a downstream IAB node via the DU.

IAB node 150A may be connected to an upstream IAB node 150B via MT 152A function. IAB node 150A may be connected to UE 160A via the DU 151A. IAB node 150B may be connected to an upstream IAB node or IAB donor 140 via MT 152B function. IAB node 150B may be connected to UE 160B via DU 151B. IAB node 150B may be connected to downstream IAB node 150A via DU 151B.

In some embodiments of the present disclosure, each of the IAB node 150A and IAB node 150B may host a Backhaul Adaptation Protocol (BAP) layer, a Radio Link Control (RLC) layer, a Medium Access Control (MAC) layer, and a Physical layer (PHY). BAP entities may be established at the BAP layer. A BAP entity may receive BAP Data Protocol Data Units (PDUs) from an ingress RLC channel of an ingress link (hereinafter, "Type 1 data"). Type 1 data may be uplink data or downlink data. For example, IAB node 150A may transmit data to IAB donor 140 via IAB node 150B. The data may be originated from IAB node 150A or a downstream node (e.g., UE 160A) of IAB node 150A. A BAP entity at the IAB node 150B may receive BAP Data Protocol Data Units (PDUs) associated with the data from IAB node 150A from an ingress RLC channel of the ingress link between IAB node 150A and IAB node 150B. A BAP entity may receive BAP Service Data Units (SDUs) from an upper layer for uplink transmission (hereinafter, "Type 2 data"). The upper layer refers to a layer above the BAP layer, for example, an Internet Protocol (IP) layer or an application layer. For example, UE 160B may transmit data to IAB donor 140 via IAB node 150B, or IAB node 150B itself may transmit data to IAB donor 140. A BAP entity at the IAB node 150B may receive BAP SDUs associated with the data from an upper layer.

In some embodiments of the present disclosure, a BAP PDU may include a header having a BAP ADDRESS field and a PATH field. The BAP ADDRESS field may carry the BAP address of the destination of the BAP PDU. The PATH field may carry an identity of a path to the destination.

Still referring to FIG. 1B, the BS (e.g., IAB donor 140) may include at least one DU to support UEs and MTs of downstream IAB nodes. One DU of a BS can support at least one cell. One cell can be supported by only one DU of a BS or one DU of an IAB node. A Central Unit (CU) 141 included in the IAB donor 140 controls the DUs of all IAB nodes (e.g., IAB node 150A and IAB node 150B) and the DU(s) (e.g., DU 142) resided in the IAB donor 140. The DU(s) and the CU of an IAB donor may be co-located or may be located in different positions. The DU(s) and the CU of the IAB donor are connected via F1 interface. In other words, the F1 interface provides means for interconnecting the CU and the DU(s) of an IAB donor. The F1 Application Protocol (F1AP) supports the functions of F1 interface by certain F1AP signaling procedures.

In some embodiments of the present disclosure, CU 141 of the IAB donor 140 may host Radio Resource Control (RRC), Service Data Adaptation Protocol (SDAP) and Packet Data Convergence Protocol (PDCP) layers of the IAB donor 140. DU 142 of the IAB donor 140 may host Backhaul Adaptation Protocol (BAP) layer, Radio Link Control (RLC) layer, Medium Access Control (MAC) layer and Physical layer (PHY) of the IAB donor 140. BAP entities may be established at the BAP layer of the DU 142. A BAP entity at the BAP layer of the DU 142 may receive BAP SDUs from an upper layer for downlink transmission (hereinafter, "Type 3 data"). The upper layer refers to a layer above the BAP layer, for example, an Internet Protocol (IP) layer or an application layer. For example, IAB donor 140 may transmit data to IAB nodes (e.g., IAB node 150A and IAB node 150B) or UEs (e.g., UE 160A, UE 160B, UE 160C).

The wireless communication system 100A is in a stand-alone (SA) mode, in which each IAB node has only one parent node. In some other embodiments of the present disclosure, a wireless communication system may be in a non-standalone (NSA) mode, in which one or more IAB nodes may have more than one parent node.

Referring back to FIG. 1A, IAB node 120A, IAB node 120B, IAB node 120C, IAB node 120D, IAB node 120E, and IAB node 120F in FIG. 1A may function as IAB node 150A or IAB node 150B in FIG. 1B, and the donor node 110 in FIG. 1A may function as IAB donor 140 in FIG. 1B.

A BAP layer may support functions such as routing or re-routing packets to the next hop, determination of BAP destination and BAP path for packets from upper layers, and determination of egress RLC channels for packets routed to the next hop. More details on the functionalities of the BAP layer according to the embodiments of the present disclosure will be illustrated in the following text in combination with the appended drawings.

Figure 2:
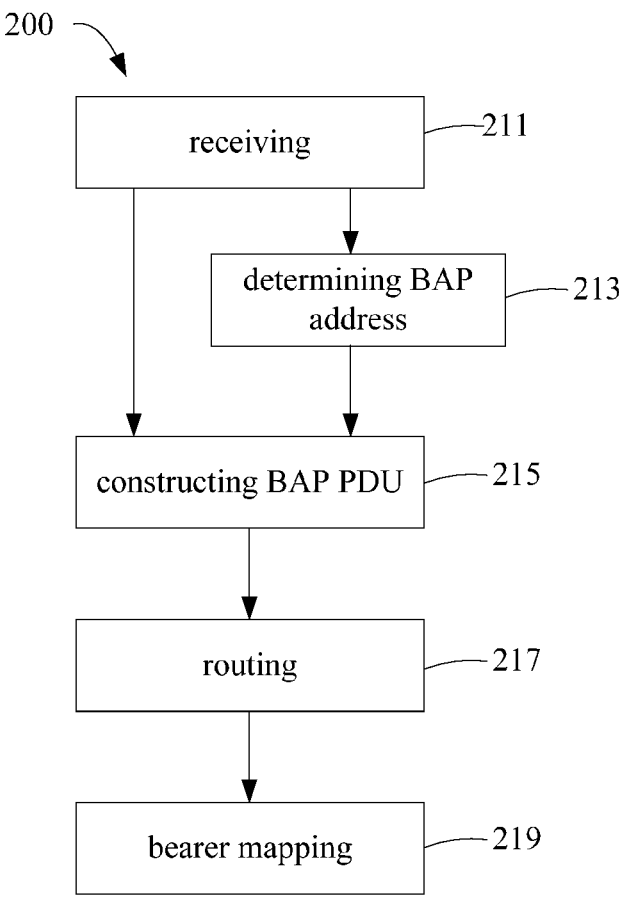
FIG. 2 illustrates an exemplary procedure of data transfer according to some embodiments of the present disclosure.

FIG. 2 illustrates an exemplary procedure 200 of data transfer according to some embodiments of the present disclosure. The exemplary procedure may occur at a BAP layer located at a communication device (e.g., IAB nodes shown in FIGS. 1A and 1B) or a DU (e.g., DU of donor node 110 in FIG. 1A or DU 142 shown in FIG. 1B) of a base station. BAP entities may be established at the BAP layer.

Referring to FIG. 2, at operation 211, in some cases, a BAP entity established at the BAP layer may receive a BAP PDU from an ingress RLC channel of an ingress link (Type 1 data). In response to receiving Type 1 data, the BAP entity may, at operation 215, construct a BAP data PDU according to the received BAP PDU. For example, the BAP entity may construct a BAP data PDU by setting its BAP ADDRESS field to the BAP ADDRESS field in the header of the received BAP PDU, and setting its PATH field to the PATH field in the header of the received BAP PDU.

In some cases, at operation 211, the BAP entity may receive a BAP SDU from an upper layer (Type 2 data or Type 3 data). In response to receiving Type 2 data or Type 3 data, the BAP entity may, at operation 213, determine a BAP address for the BAP SDU. In some embodiments, the BAP entity may also determine a BAP path identity for the BAP SDU. Details regarding the determination of the BAP address and the BAP path identity will be described in the following text with respect to FIG. 3. Then, the BAP entity may, at operation 215, construct a BAP data PDU by setting its BAP ADDRESS field to the determined BAP address and setting its PATH field to the determined BAP path identity.

At operation 217, the BAP entity may perform routing to select an egress link for transmitting the BAP data PDU. In some embodiments of the present disclosure, in case of a backhaul RLF on the selected egress link, the BAP entity may reselect another egress link to re-route the BAP data PDU. Details regarding the routing or re-routing will be described in the following text with respect to FIG. 4.

At operation 219, the BAP entity may perform bearer mapping to select an egress RLC channel of the selected egress link. Then, the BAP entity may submit the BAP data PDU to the selected egress RLC channel of the selected egress link for transmission. Bearer mapping is also need for packet re-routing cases. For example, the BAP entity may perform bearer mapping to a reselected egress RLC channel of the reselected egress link. Details regarding the bearer mapping will be described in the following text with respect to FIG. 5.

It should be appreciated by persons skilled in the art that the sequence of the operations in exemplary procedure 200 may be changed and some of the operations in exemplary procedure 200 may be eliminated or modified, without departing from the spirit and scope of the disclosure.

Figure 3:
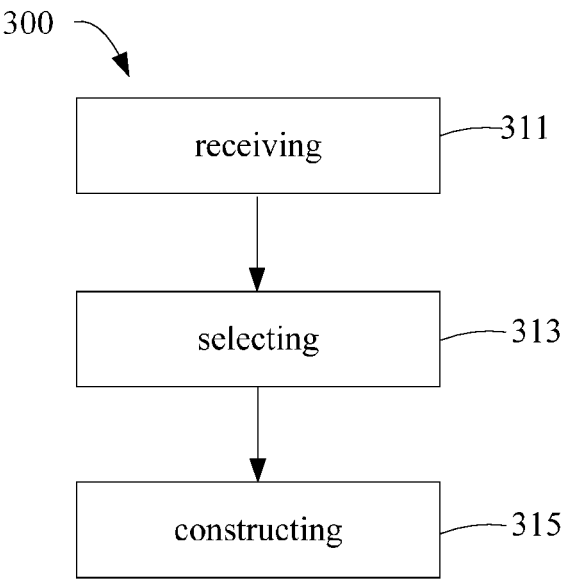
FIG. 3 illustrates an exemplary procedure of routing ID selection according to some embodiments of the present disclosure.

FIG. 3 illustrates an exemplary procedure 300 of routing ID selection according to some embodiments of the present disclosure. The exemplary procedure 300 is applicable to the above-mentioned procedure 200. Details described in all the foregoing embodiments of the present disclosure are applicable for the embodiments shown in FIG. 3.

Referring to FIG. 3, in some embodiments of the present disclosure, at operation 311, a communication device (e.g., IAB nodes in FIGS. 1A and 1B) may receive configuration information indicating at least one candidate routing identity (ID) from a base station (e.g., donor node 110 in FIG. 1A or IAB donor 140 in FIG. 1B). The at least one candidate routing identity may be configured for packet re-routing purpose. Each candidate routing identity indicates at least one of a BAP address, a BAP path identity, and a next hop BAP address. The configuration information may be received via F1 signaling or a RRC signaling.

At operation 313, in response to receiving, at the BAP layer of the communication device, a BAP SDU from an upper layer for uplink transmission (Type 2 data), the communication device may select a routing ID for transmitting the Type 2 data based on uplink backhaul configuration information, as defined in 3GPP technical specification. The upper layer refers to a layer above the BAP layer, for example, an Internet Protocol (IP) layer or an application layer. The routing ID may indicate a BAP address, which indicates the destination of the data. The routing ID may also indicate a BAP path identity, which indicates a path to the destination. In some scenarios, a RLF may occur on the egress link associated with the selected routing ID. In these scenarios, the communication device may select or reselect a candidate routing identity from the at least one candidate routing identity, wherein an egress link associated with the selected candidate routing identity does not include the above-mentioned failed link. The communication device may, at operation 315, use the BAP address and the BAP path identity of the selected candidate routing identity to construct a BAP PDU.

For example, referring back to FIG. 1A, UE 130B may transmit data to donor node 110 via IAB node 120C. IAB node 120C may select a routing ID identifying the route "IAB node 120C→IAB node 120A→donor node 110" for transmitting the data. In the selected route, IAB node 120A may be referred to as a next hop IAB node. However, a RLF may occur on the backhaul link between IAB node 120C and IAB node 120A. In this scenario, the selected route would not be available because the egress link between IAB node 120C and the next hop IAB node 120A is failed. IAB node 120C may select or reselect, for example, a candidate routing identity identifying the route "IAB node 120C→IAB node 120B→donor node 110" for transmitting the data. IAB node 120C may avoid selecting a candidate routing identity associated with the failed link between IAB node 120C and IAB node 120A.

Referring to FIG. 3, in some embodiments of the present disclosure, at operation 311, a DU (e.g., DU of donor node 110 in FIG. 1A or DU 142 shown in FIG. 1B) of a base station may receive configuration information indicating at least one candidate path identity (ID) from a CU (e.g., CU of donor node 110 in FIG. 1A or CU 141 shown in FIG. 1B) of the base station. The at least one candidate path identity may be configured for packet re-routing purpose. Each candidate path identity indicates a BAP path identity. The configuration information may be received via F1 signaling.

At operation 313, in response to receiving, at the BAP layer of the DU, a BAP SDU from an upper layer for downlink transmission (Type 3 data), the DU may select a path ID for transmitting the Type 3 data based on downlink backhaul configuration information, as defined in 3GPP technical specification. The upper layer refers to a layer above the BAP layer, for example, an Internet Protocol (IP) layer or an application layer. The path ID may indicate a path to the destination of the data. In some scenarios, a RLF may occur on a backhaul link associated with the selected path ID. In these scenarios, the DU may select or reselect a candidate path identity from the at least one candidate path identity, wherein the backhaul link associated with the selected candidate path identity does not include the above-mentioned failed backhaul link. The DU may, at operation 315, use the selected candidate path identity and the destination of the data to construct a BAP PDU.

For example, referring back to FIG. 1A, donor node 110 may transmit data to UE 130B (i.e., the destination). Donor node 110 (e.g., DU of the donor node 110) may select a path for transmitting the data. Donor node 110 may select a path ID associated with the link between the donor node 110 and IAB node 120A for transmitting the data to UE 130B. However, a RLF may occur on the backhaul link between IAB node 120A and donor node 110. Therefore, from the perspective of donor node 110, the egress link between donor node 110 and IAB node 120A is broken. In this scenario, donor node 110 may select or reselect, for example, a candidate path identity associated with the egress link between the donor node 110 and IAB node 120B for transmitting the data. Donor node 110 may avoid selecting a candidate path identity associated with the failed link between donor node 110 and IAB node 120A.

It should be appreciated by persons skilled in the art that the sequence of the operations in exemplary procedure 300 may be changed and some of the operations in exemplary procedure 300 may be eliminated or modified, without departing from the spirit and scope of the disclosure.

Figure 4:
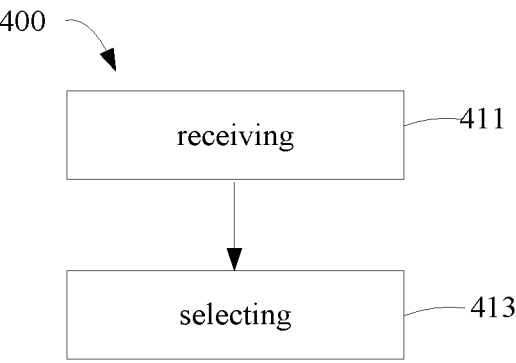
FIG. 4 illustrates an exemplary routing procedure according to some embodiments of the present disclosure.

FIG. 4 illustrates an exemplary routing procedure 400 according to some embodiments of the present disclosure. The exemplary procedure 400 is applicable to the above-mentioned procedure 200. Details described in all the foregoing embodiments of the present disclosure are applicable for the embodiments shown in FIG. 4.

Referring to FIG. 4, in some embodiments of the present disclosure, a communication device (e.g., IAB nodes shown in FIGS. 1A and 1B) may receive, at operation 411, configuration information indicating routing configuration from a base station. The configuration information may be received via F1 signaling or a RRC signaling. In some embodiments of the present disclosure, a DU (e.g., DU of donor node 110 in FIG. 1A or DU 142 shown in FIG. 1B) of a base station may receive, at operation 411, configuration information indicating routing configuration from a CU of the base station. The configuration information may be received via F1 signaling. In some embodiments of the present disclosure, the routing configuration may include at least one entry, and each entry may include at least one of a BAP address, a BAP path identity, and a next hop BAP address.

At operation 413, the communication device or the DU may select an egress link for transmit a BAP data PDU based on the routing configuration and the header of the BAP data PDU.

For example, in some embodiments of the present disclosure, the communication device or the DU may determine that there is an entry in the routing configuration having the same BAP address as the BAP address in the BAP ADDRESS field of the BAP data PDU and a BAP path identity the same as the BAP path identity in the PATH field of the BAP data PDU. The communication device or the DU may also determine that an egress link corresponding to the next hop BAP address of the above entry is available, that is, no RLF occurs on the egress link. The communication device or the DU may select the above entry and may select the egress link corresponding to the next hop BAP address of the selected entry.

In some embodiments of the present disclosure, the communication device or the DU may determine that the routing configuration does not include such entry. For example, an egress link corresponding to the next hop BAP address of an entry in the routing configuration, which has the same BAP address as the BAP address in the BAP ADDRESS field of the BAP data PDU and a BAP path identity the same as the BAP path identity in the PATH field of the BAP data PDU, is not available. This may happen when, for example, a RLF occurs on the egress link. In these embodiments, the communication device or the DU may try to re-route the BAP data PDU, which has not been acknowledged by a lower layer. The lower layer refers to a layer below the BAP layer, for example, a RRC layer.

For example, the communication device or the DU may determine that there is at least one entry in the routing configuration having the same BAP address as the BAP address in the BAP ADDRESS field of the BAP data PDU, and an egress link corresponding to the next hop BAP address of the above at least one entry is available. If only one entry satisfy the above requirements, the communication device or the DU may select this entry. If there are more than one entry satisfy the above requirements, the communication device or the DU may select one from the more than one entry based on certain criteria including, for example, channel qualities, loading, or configured priority. For example, a priority may be configured for each entry. The entry having the highest priority among the more than one entry may be selected. As mentioned above, each entry is associated with an egress link corresponding to the next hop BAP address of the entry. In some examples, the entry whose associated egress link having the best channel quality among the more than one entry may be selected. The channel quality may be determined based on at least one or more of the following: Reference Signal Received Power (RSRP), Reference Signal Strength Indicator (RSSI), or Reference Signal Receiving Quality (RSRQ). Other channel quality metrics may also be employed. In some examples, the entry whose associated egress link having the lightest loading among the more than one entry may be selected. The communication device or the DU may select the egress link corresponding to the next hop BAP address of the selected entry.

In some embodiments of the present disclosure, the communication device or the DU may determine that there is no entry in the routing configuration having the same BAP address as the BAP address in the BAP ADDRESS field of the BAP data PDU. In some embodiments of the present disclosure, the communication device or the DU may select one of the available egress links for data transmission. For example, the communication device may randomly select an available egress link for data transmission. In some embodiments of the present disclosure, the communication device or the DU may transmit assistant information to a base station. The assistant information may indicate no available link for transmitting the data. In some embodiments, the communication device may transmit the assistant information to a base station by RRC signaling. In some embodiments, the DU of a base station may transmit the assistant information to a CU of the base station by F1 signaling.

The above procedure is applicable to both uplink transmission and downlink transmission. For example, referring back to FIG. 1A, UE 130A may transmit data to donor node 110. IAB node 120D may select a route "IAB node 120C→IAB node 120A→donor node 110" for transmitting the data. IAB node 120C may receive the data from an ingress RLC channel of an ingress link between IAB node 120C and IAB node 120D. IAB node 120C may decode the data into a BAP data PDU having a BAP ADDRESS field and a PATH field corresponding to the above route. IAB node 120C may determine that a RLF occurs on the backhaul link between IAB node 120A and IAB node 120C. In this case, IAB node 120C may determine that there is an entry in the routing configuration having the same BAP address as the BAP address in the BAP ADDRESS field of the BAP data PDU and a BAP path identity the same as the BAP path identity in the PATH field of the BAP data PDU. For example, IAB node 120C may found an entry associated with the route "IAB node 120C→IAB node 120A→donor node 110." However, since a RLF occurs on the backhaul link between IAB node 120A and IAB node 120C, the egress link (e.g., from IAB node 120C to IAB node 120A) corresponding to the next hop BAP address of the entry is not available.

IAB node 120C may then determine whether there is an entry in the routing configuration having the same BAP address as the BAP address in the BAP ADDRESS field of the BAP data PDU, and an egress link corresponding to the next hop BAP address of the above at least one entry is available. For example, IAB node 120C may found that the egress link from IAB node 120C to IAB node 120B is available, and may select this egress link for data transmission.

In some cases, IAB node 120C may determine that there is no entry in the routing configuration having the same BAP address as the BAP address in the BAP ADDRESS field of the BAP data PDU. In these cases, in some embodiments, IAB node 120C may select any one of the available egress links for data transmission. In some other embodiments, IAB node 120C may transmit to donor node 110 assistant information indicating no available link for transmitting the data.

In some other examples, donor node 110 may select a route "IAB node 120A→IAB node 120C→IAB node 120D" for transmitting data to UE 130A. IAB node 120C may receive the data from an ingress RLC channel of an ingress link between IAB node 120C and IAB node 120A. IAB node 120C may decode the data into a BAP data PDU having a BAP ADDRESS field and a PATH field corresponding to the above route. IAB node 120C may determine that a RLF occurs on the backhaul link between IAB node 120C and IAB node 120D. IAB node 120C may found that an entry in the routing configuration having the same BAP address as the BAP address in the BAP ADDRESS field of the BAP data PDU. For example, IAB node 120C may found that an entry associated with the route "IAB node 120E→IAB node 120F→IAB node 120D" in the routing configuration, and may select the egress link from IAB node 120C to IAB node 120E for data transmission.

In some cases, IAB node 120C may determine that there is no entry in the routing configuration having the same BAP address as the BAP address in the BAP ADDRESS field of the BAP data PDU. That is, no entry in the routing configuration has a BAP address indicating IAB node 120D. In some embodiments, IAB node 120C may select any one of the available egress links for data transmission. In some other embodiments, IAB node 120C may transmit to donor node 110 assistant information indicating no available link for transmitting the data.

It should be appreciated by persons skilled in the art that the sequence of the operations in exemplary procedure 400 may be changed and some of the operations in exemplary procedure 400 may be eliminated or modified, without departing from the spirit and scope of the disclosure. For example, in some embodiments of the present disclosure, routing configuration may not be configured. In these embodiments, the configuration operation (e.g., operation 411) may be eliminated. The communication device or the DU may, at operation 413, select any of the egress links for data transmission.

After selecting an egress link, a communication device or a DU of a base station may perform bearing mapping to map UE bearer/ingress RLC channel to egress RLC channel(s) of the selected egress link. Such bearer mapping may be performed based on backhaul RLC channel mapping configuration configured by a base station (e.g., CU of the base station). In some embodiments of the present disclosure, a base station may configure respective backhaul RLC channel mapping configuration for uplink transmission and downlink transmission. In some embodiments of the present disclosure, for Type 1 data, the base station may configure bearer mapping between an ingress RLC channel for an ingress link and an egress RLC channel of an egress link. In some embodiments of the present disclosure, for Type 2 data and Type 3 data, the base station may configure bearer mapping between UE bearer(s) and egress RLC channel(s).

As mentioned above, in the case of a RLF on an originally selected egress link, a communication device or a DU may perform re-routing and select a new egress link. In this scenario, the communication device or the DU still need to perform bearing mapping to map UE bearer/ingress RLC channel to egress RLC channel(s) of the newly selected egress link. Details regarding the bearing mapping in the case of a RLF on an originally selected egress link will be described in the following text with respect to FIG. 5.

Figure 5:
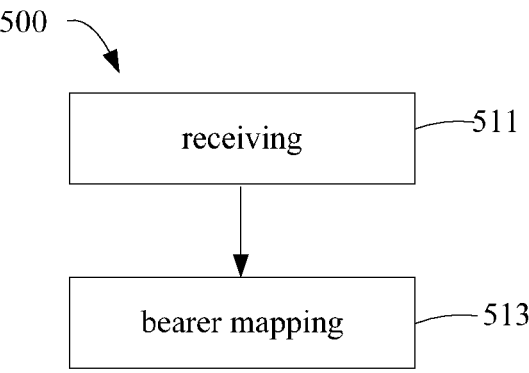
FIG. 5 illustrates an exemplary procedure of bearer mapping according to some embodiments of the present disclosure.

FIG. 5 illustrates an exemplary procedure 500 of bearer mapping according to some embodiments of the present disclosure. The exemplary procedure 500 is applicable to the above-mentioned procedure 200. Details described in all the foregoing embodiments of the present disclosure are applicable for the embodiments shown in FIG. 5.

Referring to FIG. 5, in some embodiments of the present disclosure, a communication device (e.g., IAB nodes shown in FIGS. 1A and 1B) may receive, at operation 511, configuration information indicating bearer mapping configuration from a base station. The configuration information may be received via F1 signaling or a RRC signaling. In some embodiments of the present disclosure, a DU (e.g., DU of donor node 110 in FIG. 1A or DU 142 shown in FIG. 1B) of a base station may receive, at operation 511, configuration information indicating bearer mapping configuration from a CU of the base station. The configuration information may be received via F1 signaling. In some embodiments of the present disclosure, the bearer mapping configuration is configured for packet re-routing purpose.

At operation 513, the communication device or the DU may perform bearer mapping based on the bearer mapping configuration.

In some embodiments of the present disclosure, for Type 1 data, Type 2 data, and Type 3 data, the base station may configure a common default egress RLC channel of an egress link for re-routing. For example, at a communication device, for Type 1 data and Type 2 data, the bearer mapping configuration may indicate a common default egress RLC channel (e.g., RLC channel #A) of an egress link (e.g., egress link #A) for re-routing. If egress link #A is selected for re-routing, the communication device may map Type 1 data or Type 2 data to RLC channel #A of the selected egress link for re-routing. At a DU of a base station, for Type 3 data, the bearer mapping configuration may indicate a default egress RLC channel (e.g., RLC channel #B) of an egress link (e.g., egress link #B) for re-routing. If egress link #B is selected for re-routing, the DU may map Type 3 data to RLC channel #B of the selected egress link for re-routing.

In some embodiments of the present disclosure, for Type 1 data, Type 2 data, and Type 3 data, the base station may configure respective default egress RLC channels of an egress link for re-routing. For example, at a communication device, for Type 1 data, the bearer mapping configuration may indicate a default egress RLC channel (e.g., RLC channel #A-1) of an egress link (e.g., egress link #A) for re-routing, and for Type 2 data, the bearer mapping configuration may indicate another default egress RLC channel (e.g., RLC channel #A-2) of the egress link (e.g., egress link #A) for re-routing. If egress link #A is selected for re-routing, the communication device may map Type 1 data to RLC channel #A-1 of the selected egress link for re-routing, and may map Type 2 data to RLC channel #A-2 of the selected egress link for re-routing. At a DU of a base station, for Type 3 data, the bearer mapping configuration may indicate a default egress RLC channel (e.g., RLC channel #B) of an egress link (e.g., egress link #B) for re-routing. If egress link #B is selected for re-routing, the DU may map Type 3 data to RLC channel #B of the selected egress link for re-routing.

In some embodiments of the present disclosure, for Type 1 data, the base station may configure bearer mapping between a UE bearer in an ingress RLC channel of an ingress link and an egress RLC channel of an egress link for re-routing. In some other embodiments of the present disclosure, for Type 1 data, the base station may configure bearer mapping between an ingress RLC channel of an ingress link and an egress RLC channel of an egress link for re-routing.

In some embodiments of the present disclosure, for Type 2 data, the base station may configure bearer mapping between a UE bearer and an egress RLC channel of an egress link for re-routing. In some embodiments of the present disclosure, for Type 3 data, the base station may configure bearer mapping between a UE bearer and an egress RLC channel of an egress link for re-routing.

For example, at a communication device, for Type 1 data (a BAP PDU from an ingress RLC channel of an ingress link), one or more UE bearers (e.g., UE bearer #A and UE bearer #B) may be mapped to the ingress RLC channel (e.g., RLC channel #A) of the ingress link. In some examples, the bearer mapping configuration received at the communication device may indicate bearer mapping between UE bearer #A in RLC channel #A and an egress RLC channel (e.g., RLC channel #B-1) of an egress link (e.g., egress link #B) for re-routing, and may indicate bearer mapping between UE bearer #B in RLC channel #A and an egress RLC channel (e.g., RLC channel #B-2) of the egress link (e.g., egress link #B) for re-routing. If egress link #B is selected for re-routing of the Type 1 data, the communication device may map UE bearer #A to RLC channel #B-1, and map UE bearer #B to RLC channel #B-2 of the selected egress link for re-routing.

In some other examples, the bearer mapping configuration may indicate bearer mapping between RLC channel #A and RLC channel #B-1 of egress link #B for re-routing. If egress link #B is selected for re-routing of the Type 1 data, the communication device may map UE bearers (e.g., UE bearer #A and UE bearer #B) in RLC channel #A to RLC channel #B-1 of the selected egress link for re-routing.

Similarly, at a communication device, for Type 2 data (BAP SDUs from an upper layer for uplink transmission), the bearer mapping configuration may indicate bearer mapping between a UE bearer associated with the Type 2 data and an egress RLC channel of an egress link for re-routing. At a DU of a base station, for Type 3 data (BAP SDUs from an upper layer for downlink transmission), the bearer mapping configuration may indicate bearer mapping between a UE bearer associated with the Type 3 data and an egress RLC channel of an egress link for re-routing.

In some embodiments of the present disclosure, in response to receiving the bearer mapping configuration, the communication device or the DU may allow re-routing. In some other embodiments of the present disclosure, the bearer mapping configuration may not be configured. In these embodiments, the communication device or the DU may forbid re-routing.

It should be appreciated by persons skilled in the art that the sequence of the operations in exemplary procedure 500 may be changed and some of the operations in exemplary procedure 500 may be eliminated or modified, without departing from the spirit and scope of the disclosure.

It should be appreciated by persons skilled in the art that although operations in exemplary procedure 300, exemplary procedure 400, and exemplary procedure 500 show respective configuration operations (e.g., operations 311, 411, and 511) for receiving configuration information. Two or more of these configuration operations may be combined into one. For example, a communication device or a DU of a base station may receive routing configuration, bearer mapping configuration, configuration information indicating at least one candidate routing identity in one or more messages.

In wireless communication systems, a buffer status reporting procedure is used to provide information about the size of data in uplink (UL) buffers of a UE to a base station serving the UE. A Buffer Status Report (BSR) may be triggered when UL data arrives at a UE transmission buffer. In response to the BSR from the UE, the base station may transmit to the UE a UL grant for subsequent data transmission from the UE. Similarly, a BSR may be triggered when UL data arrives at an IAB node, and may be transmitted to a parent node of the IAB node. In response to the BSR, the parent node of the IAB node may transmit to the IAB node a UL grant for subsequent data transmission from the IAB node.

In multi-hop networks, an IAB node may transmit a BSR to its parent node before the IAB node receives the UL data from its child node (a UE or another IAB node) to reduce latency resulted from UL scheduling. Such BSR that is transmitted before the reception of the UL data from the child node are hereinafter referred to as a Pre-emptive BSR (Pre-BSR). A Scheduling Request (SR) is used to request UL resources. The SR may be triggered if the UE or the IAB node does not have a UL resource available for BSR or Pre-BSR transmission.

As mentioned above, when a RLF occurs on the link between an IAB node (e.g., IAB node 120C in FIG. 1A) and its parent node (e.g., IAB node 120A in FIG. 1A), IAB node 120C may perform UL packet re-routing for the data (hereinafter, "re-routed data") intended to IAB node 120A and buffered at IAB node 120C to, for example, IAB node 120B. In this scenario, in some embodiments of the present disclosure, a BSR indicating information about the size of the re-routed data may not be triggered or transmitted. As a consequence, uplink resources associated with a previous BSR may be insufficient for transmitting the re-routed data. IAB node 120C may obtain sufficient uplink resources for transmitting the re-routed data only after the transmission of a next BSR. This may cause latency for UL data transmission.

In some other embodiments of the present disclosure, in response to a RLF on the link between an IAB node and its parent node and re-routing the data to the reselected parent node, a BSR or Pre-BSR may be triggered at the IAB node (e.g., IAB node 120C) and some of its upstream IAB node(s) (e.g., IAB node 120B) to request uplink resources for transmitting the re-routed data. Such UL scheduling procedure will be described in detail in the following text with respect to FIG. 6.

Figure 6:
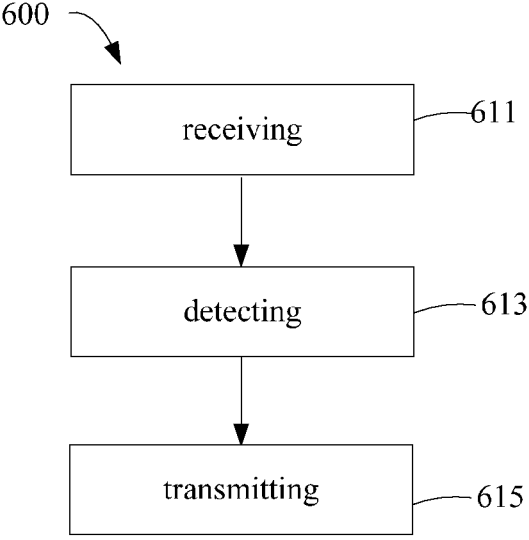
FIG. 6 illustrates an exemplary procedure of handling a uplink transmission according to some embodiments of the present disclosure.

FIG. 6 illustrates a flow chart of exemplary procedure 600 handling a UL transmission according to some embodiments of the present disclosure. Details described in all the foregoing embodiments of the present disclosure are applicable for the embodiments shown in FIG. 6.

Referring to FIG. 6, at operation 611, a communication device may receive a UL transmission from a child node of the communication device. The communication device may select an egress link (original egress link) between the communication device and a parent node of the communication device for transmitting the UL transmission.

At operation 613, the communication device may detect a RLF on the original egress link. The communication device may then re-route the UL transmission to another egress link (re-routed egress link) between the communication device and another parent node of the communication device. The re-routing procedure is described above with respect to FIGS. 2-5, and thus is omitted herein.

In some embodiments of the present disclosure, in response to the detection of the RLF on the original egress link, the selection of the re-routed egress link, or the re-routing procedure, the communication device may trigger a BSR or a Pre-BSR associated with the re-routed UL transmission. In other words, a new trigger condition (e.g., detection of a RLF on the original egress link, selection of the re-routed egress link, or upon re-routing) may be configured for BSR or Pre-BSR transmission. At operation 615, the communication device may transmit the BSR or the Pre-BSR to the another parent node.

In some embodiments of the present disclosure, during the re-routing procedure (e.g., a bearer mapping procedure), an egress RLC channel of the re-routed egress link may be reselected for carrying the re-routed UL transmission. The egress RLC channel of the re-routed egress link may correspond to a logical channel in a Logical Channel Group (LCG). This logical channel may be considered as having the highest priority level within the LCG. In this manner, the communication device may trigger a BSR or a Pre-BSR associated with the above logical channel to request uplink resources for transmitting the re-routed data. At operation 615, the communication device may transmit the BSR or the Pre-BSR to the another parent node.

In some embodiments of the present disclosure, a SR may be triggered if the communication device does not have UL resource for transmitting the BSR or Pre-BSR.

It should be appreciated by persons skilled in the art that the sequence of the operations in exemplary procedure 600 may be changed and some of the operations in exemplary procedure 600 may be eliminated or modified, without departing from the spirit and scope of the disclosure.

Figure 7:
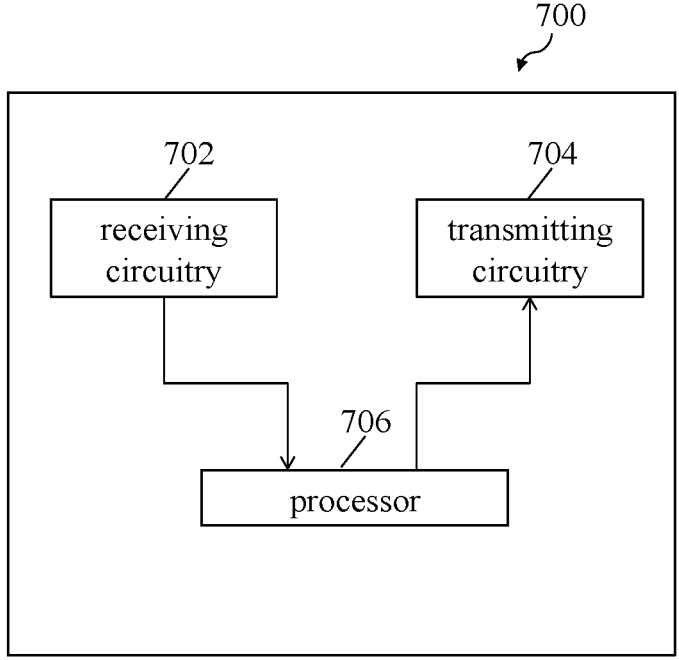
FIG. 7 illustrates an example block diagram of an apparatus according to some embodiments of the present disclosure.

FIG. 7 illustrates an example block diagram of an apparatus 700 according to some embodiments of the present disclosure.

As shown in FIG. 7, the apparatus 700 may include at least one non-transitory computer-readable medium (not illustrated in FIG. 7), a receiving circuitry 702, a transmitting circuitry 704, and a processor 706 coupled to the non-transitory computer-readable medium (not illustrated in FIG. 7), the receiving circuitry 702 and the transmitting circuitry 704. The apparatus 700 may be a BS or a communication device (e.g., an IAB node or a UE).

Although in this figure, elements such as processor 706, transmitting circuitry 704, and receiving circuitry 702 are described in the singular, the plural is contemplated unless limitation to the singular is explicitly stated. In some embodiments of the present disclosure, the receiving circuitry 702 and the transmitting circuitry 704 are combined into a single device, such as a transceiver. In certain embodiments of the present disclosure, the apparatus 700 may further include an input device, a memory, and/or other components.

In some embodiments of the present disclosure, the non-transitory computer-readable medium may have stored thereon computer-executable instructions to cause a processor to implement the method with respect to the communication device or IAB node as described above. For example, the computer-executable instructions, when executed, cause the processor 706 interacting with receiving circuitry 702 and transmitting circuitry 704, so as to perform the steps with respect to the communication devices or IAB nodes depicted in FIGS. 1A, 1B, and 2-6.

In some embodiments of the present disclosure, the non-transitory computer-readable medium may have stored thereon computer-executable instructions to cause a processor to implement the method with respect to the BS as described above. For example, the computer-executable instructions, when executed, cause the processor 706 interacting with receiving circuitry 702 and transmitting circuitry 704, so as to perform the steps with respect to the IAB donors or base stations depicted in FIGS. 1A, 1B, and 2-6.

In some embodiments of the present disclosure, the non-transitory computer-readable medium may have stored thereon computer-executable instructions to cause a processor to implement the method with respect to the BS as described above. For example, the computer-executable instructions, when executed, cause the processor 706 interacting with receiving circuitry 702 and transmitting circuitry 704, so as to perform the steps with respect to the DUs of the IAB donors or base stations depicted in FIGS. 1A, 1B, and 2-6.

In some embodiments of the present disclosure, the non-transitory computer-readable medium may have stored thereon computer-executable instructions to cause a processor to implement the method with respect to the BS as described above. For example, the computer-executable instructions, when executed, cause the processor 706 interacting with receiving circuitry 702 and transmitting circuitry 704, so as to perform the steps with respect to the CUs of the IAB donors depicted in FIGS. 1A, 1B, and 2-6.

Those having ordinary skill in the art would understand that the steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for the operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "includes", "including", or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a", "an", or the like does not, without more constraints, preclude the existence of additional identical elements in the process, method, article, or apparatus that includes the element. Also, the term "another" is defined as at least a second or more. The term "having" and the like, as used herein, are defined as "including."

The following is what is claimed:

1. An apparatus for wireless communication, comprising:
at least one memory; and
at least one processor coupled with the at least one memory and configured to cause the apparatus to:
select a first egress link between the apparatus and a first next hop communication device;
receive, from a base station, configuration information, the configuration information indicating routing configuration and bearer mapping configuration;
detect a failure on the first egress link between the apparatus and the first next hop communication device;
re-route first data intended to be transmitted on the first egress link, the first data has not been acknowledged by a layer lower than a backhaul adaption protocol (BAP) layer;
reselect a second egress link between the apparatus and a second next hop communication device based on the routing configuration;
reselect an egress radio link control (RLC) channel of the second egress link based on the bearer mapping configuration;
submit the first data to the reselected egress RLC channel of the second egress link; and
transmit, in response to the failure on the first egress link and re-routing the first data to the second next hop communication device, a buffer status report (BSR) or a pre-emptive BSR (pre-BSR) associated with the first data to the second next hop communication device.

2. The apparatus of claim 1, wherein the first next hop communication device is a parent node of the apparatus.

3. The apparatus of claim 2, wherein the at least one processor is configured to cause the apparatus to transmit a scheduling request to the second next hop communication device if there is no uplink resource available for transmitting the BSR or the Pre-BSR.

4. The apparatus of claim 1, wherein the configuration information further indicates at least one candidate routing identity, the at least one candidate routing identity indicates a BAP address, a BAP path identity, and a next hop BAP address.

5. The apparatus of claim 1, wherein the at least one processor is configured to cause the apparatus to:

receive second data from an upper layer; and encode the second data into a BAP protocol data unit (PDU) comprising a BAP address field and a path field by:

a candidate routing identity reselected from at least one candidate routing identity, wherein an egress link associated with the reselected candidate routing identity does not include the failed first egress link between the apparatus and the first next hop communication device; and the BAP PDU is constructed by setting the BAP address field to a BAP address of the selected candidate routing identity and setting the path field to a BAP path identity of the selected candidate routing identity.

6. The apparatus of claim 1, wherein the routing configuration comprises at least one entry, the at least one entry comprising a BAP address and a next hop BAP address.

7. The apparatus of claim 6, wherein the at least one entry of the routing configuration further comprises a path identity.

8. The apparatus of claim 6, wherein the at least one processor is configured to cause the apparatus to:

receive the first data from an ingress RLC channel of an ingress link of the apparatus;

decode the first data into a BAP protocol data unit (PDU), a header of the BAP PDU comprising a BAP address field;

determine that there is no entry in the routing configuration having a same BAP address field as the BAP address field in the header of the BAP PDU; and wherein the reselect of the second egress link comprises to select one available egress link of the apparatus as the second egress link.

9. The apparatus of claim 1, wherein the at least one processor is configured to cause the apparatus to allow re-routing at the apparatus in response to receiving the bearer mapping configuration.

10. The apparatus of claim 1, wherein for a BAP protocol data unit (PDU) received from an ingress RLC channel of an ingress link, and for an uplink BAP service data unit (SDU) received from an upper layer, the bearer mapping configuration indicates a common default egress RLC channel of the second egress link for re-routing.

11. The apparatus of claim 1, wherein for a BAP protocol data unit (PDU) received from an ingress RLC channel of an ingress link, and for an uplink BAP service data unit (SDU) received from an upper layer, the bearer mapping configuration indicates respective default egress RLC channels of the second egress link for re-routing.

12. The apparatus of claim 1, wherein:

for a BAP protocol data unit (PDU) received from an ingress RLC channel of an ingress link, the bearer mapping configuration indicates bearer mapping between a user equipment (UE) bearer in the ingress RLC channel of the ingress link and the egress RLC channel of the second egress link for the re-route; and for an uplink BAP service data unit (SDU) received from an upper layer, the bearer mapping configuration indicates bearer mapping between the UE bearer and the egress RLC channel of the second egress link for the re-route.

13. An apparatus for wireless communication, comprising:

at least one memory; and at least one processor coupled with the at least one memory and configured to cause the apparatus to:

receive configuration information indicating at least one candidate path identity;

detect a failure in a backhaul link between two communication devices;

select a candidate path identity from the at least one candidate path identity for downlink transmission, wherein an egress link associated with the selected candidate path identity does not include the failed backhaul link between the two communication devices;

transmit the downlink transmission on the egress link; and transmit, in response to the failure in the backhaul link between the two communication devices, a buffer status report (BSR) or a pre-emptive BSR (pre-BSR).

14. The apparatus of claim 13, wherein the configuration information indicates bearer mapping configuration.

15. The apparatus of claim 14, wherein:

the bearer mapping configuration indicates a default egress radio link control (RLC) channel of the egress link for re-routing; and the at least one processor is configured to cause the apparatus to select the default egress RLC channel of the egress link to transmit the downlink transmission.

16. The apparatus of 14, wherein the bearer mapping configuration indicates bearer mapping between a user equipment (UE) bearer and an egress radio link control (RLC) channel of the egress link for re-routing.

17. A method for wireless communication, the method comprising:

select a first egress link between the apparatus and a first next hop communication device;

receive, from a base station, configuration information, the configuration information indicating routing configuration and bearer mapping configuration;

detect a failure on the first egress link between an apparatus and the first next hop communication device;

re-route first data intended to be transmitted on the first egress link, the first data has not been acknowledged by a layer lower than a backhaul adaption protocol (BAP) layer;

reselect a second egress link between the apparatus and a second next hop communication device based on the routing configuration;

reselect an egress radio link control (RLC) channel of the second egress link based on the bearer mapping configuration;

submit the first data to the reselected egress RLC channel of the second egress link; and transmit, in response to the failure on the first egress link and re-routing the first data to the second next hop communication device, a buffer status report (BSR) or a pre-emptive BSR (pre-BSR) associated with the first data to the second next hop communication device.

18. The method of claim 17, wherein the configuration information further indicates at least one candidate routing identity, the at least one candidate routing identity indicates a BAP address, a BAP path identity, and a next hop BAP address.

19. The method of claim 17, further comprising:

receiving second data from an upper layer; and encoding the second data into a BAP protocol data unit (PDU) comprising a BAP address field and a path field by:

a candidate routing identity reselected from at least one candidate routing identity, wherein an egress link associated with the reselected candidate routing identity does not include the failed first egress link between the apparatus and the first next hop communication device; and the BAP PDU is constructed by setting the BAP address field to a BAP address of the reselected candidate routing identity and setting the path field to a BAP path identity of the reselected candidate routing identity.

20. The method of claim 17, wherein the routing configuration comprises at least one entry, the at least one entry comprising a BAP address and a next hop BAP address.

* * * * *